(12) United States Patent
Matsuoka

(10) Patent No.: US 9,967,676 B2
(45) Date of Patent: May 8, 2018

(54) ACOUSTIC GENERATOR, ACOUSTIC GENERATION APPARATUS, PORTABLE TERMINAL, AND ELECTRONIC APPARATUS

(71) Applicant: KYOCERA Corporation, Kyoto-shi, Kyoto (JP)

(72) Inventor: Tohru Matsuoka, Kyoto (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days. days.

(21) Appl. No.: 15/117,516

(22) PCT Filed: Nov. 29, 2014

(86) PCT No.: PCT/JP2014/081663
§ 371 (c)(1),
(2) Date: Aug. 9, 2016

(87) PCT Pub. No.: WO2015/125370
PCT Pub. Date: Aug. 27, 2015

(65) Prior Publication Data
US 2016/0353208 A1 Dec. 1, 2016

(30) Foreign Application Priority Data

Feb. 24, 2014 (JP) ................................. 2014-032951

(51) Int. Cl.
*H04R 17/00* (2006.01)
*H04M 1/03* (2006.01)
*H04R 1/02* (2006.01)

(52) U.S. Cl.
CPC ............ *H04R 17/00* (2013.01); *H04M 1/035* (2013.01); *H04R 1/028* (2013.01); *H04R 17/005* (2013.01);
(Continued)

(58) Field of Classification Search
None
See application file for complete search history.

(56) References Cited

U.S. PATENT DOCUMENTS 4,028,566 A * 6/1977 Franssen .............. H04R 17/005
29/25.35
6,453,050 B1 9/2002 Ogura et al.
(Continued)

FOREIGN PATENT DOCUMENTS

JP 01-077096 U 5/1989
JP 02-111997 U 9/1990
(Continued)

OTHER PUBLICATIONS

International Search Report, PCT/JP2014/081663, dated Feb. 10, 2015, 2 pgs.

*Primary Examiner* — Curtis Kuntz
*Assistant Examiner* — Kenny Truong
(74) *Attorney, Agent, or Firm* — Volpe and Koenig, P.C.

(57) ABSTRACT

There are provided an acoustic generator, an acoustic generation apparatus, a portable terminal and an electronic apparatus, which have an improved sound quality. An acoustic generator includes a piezoelectric element having a piezoelectric body; and a vibration plate joined to the piezoelectric body via a joining material, distances between the vibration plate and the piezoelectric body being different. Since this configuration achieves a clear and sharp sound quality, and has an effect of increasing sound pressure, the acoustic generator having an improved sound quality can be achieved.

17 Claims, 10 Drawing Sheets

(52) U.S. Cl.
CPC .... *H04R 2201/003* (2013.01); *H04R 2499/15* (2013.01)

(56) References Cited

U.S. PATENT DOCUMENTS

| | | |
|---|---|---|
| 2002/0186860 A1 | 12/2002 | Ogura et al. |
| 2012/0257772 A1* | 10/2012 | Onishi .................. H04R 17/00 381/190 |
| 2013/0094681 A1 | 4/2013 | Fukuoka et al. |
| 2013/0259274 A1* | 10/2013 | Hayashi .................. H04M 1/03 381/190 |
| 2014/0132115 A1 | 5/2014 | Fujii et al. |
| 2014/0232243 A1 | 8/2014 | Fujii et al. |
| 2014/0314255 A1 | 10/2014 | Fukuoka et al. |

FOREIGN PATENT DOCUMENTS

| | | |
|---|---|---|
| JP | 2001-160999 A | 6/2011 |
| JP | 2012-110018 A | 6/2012 |
| JP | 5225518 B1 | 7/2013 |

* cited by examiner

US 9,967,676 B2

ACOUSTIC GENERATOR, ACOUSTIC GENERATION APPARATUS, PORTABLE TERMINAL, AND ELECTRONIC APPARATUS

TECHNICAL FIELD

The present invention relates to an acoustic generator, an acoustic generation apparatus, a portable terminal, and an electronic apparatus.

BACKGROUND ART

There has been known a piezoelectric element of bimorph type which is constructed such that a plurality of internal electrode layers and a plurality of piezoelectric layers are laminated and then electrodes are formed on a surface of a stacked body. This piezoelectric element is employed in an audio apparatus such as a speaker and utilized as a vibration generating source (an acoustic generator). Specifically, such a flat-plate shaped piezoelectric element is joined to a vibration plate via a joining material so that an acoustic generator is constructed.

CITATION LIST

Patent Literature

Patent Literature 1: Japanese Unexamined Patent Publication JP-A 2001-160999

SUMMARY OF INVENTION

Technical Problem

Meanwhile, in such acoustic generators employing a piezoelectric element, further improvement in sound quality is desired.

The invention has been devised in view of the above-mentioned situation. An object thereof is to provide an acoustic generator, an acoustic generation apparatus, a portable terminal, and an electronic apparatus, which have an improved sound quality.

Solution to Problem

According to one embodiment of the invention, an acoustic generator includes: a piezoelectric element having a piezoelectric body; and a vibration plate joined to the piezoelectric element via a joining material, distances between the vibration plate and the piezoelectric body being different.

According to one embodiment of the invention, an acoustic generation apparatus includes: an acoustic generator described above; and a housing which contains the acoustic generator.

According to one embodiment of the invention, a portable terminal includes: an acoustic generator having the above-mentioned configuration; an electronic circuit; a display; and a housing, the vibration plate of the acoustic generator being the display or the housing.

According to one embodiment of the invention, an electronic apparatus includes: an acoustic generator having the above-mentioned configuration; an electronic circuit connected to the acoustic generator; and a housing which contains the electronic circuit and the acoustic generator, the electronic apparatus having a function of generating a sound through the acoustic generator.

Advantageous Effects of Invention

The invention provides an acoustic generator, an acoustic generation apparatus, a portable terminal, and an electronic apparatus having an improved sound quality.

DESCRIPTION OF EMBODIMENTS

An example of an acoustic generator according to an embodiment of the invention is described below in detail with reference to the drawings.

Figure 1:
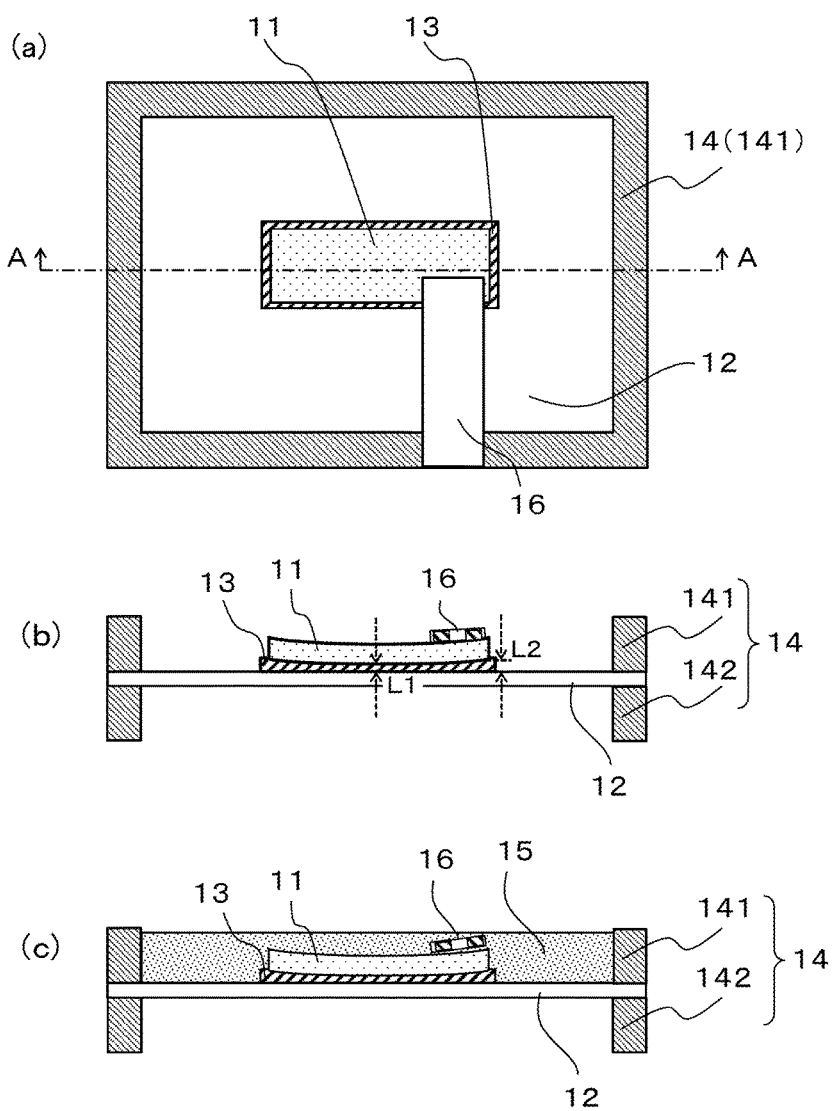
FIG. 1(a) is a plan view showing an example of an acoustic generator according to the present embodiment.
FIG. 1(b) is a schematic sectional view taken along the line A-A in FIG. 1(a)
FIG. 1(c) is a schematic sectional view showing another example of the acoustic generator according to the present embodiment.
Figure 2:
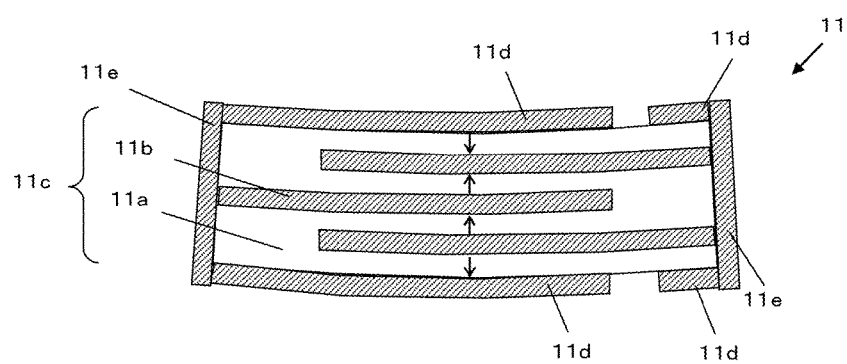
FIG. 2 is a schematic sectional view of an example of a piezoelectric element shown in FIG. 1.

FIG. 1(a) is a plan view showing an example of an acoustic generator according to the present embodiment. FIG. 1(b) is a schematic sectional view taken along the line A-A in FIG. 1(a). FIG. 1(c) is a schematic sectional view showing another example of the acoustic generator according to the present embodiment. Further, FIG. 2 is a schematic sectional view of an example of a piezoelectric element shown in FIG. 1. Here, in FIGS. 1(b) and 1(c), the acoustic generator 1 is shown in a manner of being expanded in the thickness direction.

The acoustic generator 1 according to the embodiment shown in FIG. 1 includes: a piezoelectric element 11 having a piezoelectric body 11a; and a vibration plate 12 joined to the piezoelectric element 11 via a joining material, distances between the vibration plate 12 and the piezoelectric body 11a being different.

The piezoelectric element 11 is an exciter which is provided on a surface of the vibration plate 12 by gluing or otherwise and then vibrates in response to application of a voltage so as to excite the vibration plate 12.

The piezoelectric element 11 includes: a stacked body 11c in which four piezoelectric layers constituting the piezoelectric body 11a and three layers of internal electrodes 11b are alternately laminated; surface electrodes 11d formed on an upper face and a lower face of the stacked body 11c; and external electrodes 11e which are formed on side surfaces where the internal electrodes 11b are extracted and which are connected to the surface electrodes 11d.

Here, the piezoelectric element 11 has a shape elongated in one direction when viewed in a plan view, for example, a rectangular plate shape when viewed in a plan view, and a first principal surface (an upper face in the figure) and a second principal surface (a lower face in the figure) have rectangular shapes. Further, the piezoelectric layers constituting the piezoelectric body 11a are polarized so that a direction of polarization with reference to a direction of electric field applied at a particular moment is reversed on one side and on the other side in the thickness direction. Here, the direction of polarization in each piezoelectric layer constituting the piezoelectric body 11a is indicated by an arrow in FIG. 2.

As the material for constituting the piezoelectric body 11a, piezoelectric ceramics employed in the conventional art like a non-lead based piezoelectric material such as lead zirconate titanate, a Bi layer compound, and a tungsten bronze structure compound, may be employed.

Further, as the material for the internal electrodes 11b, various metallic materials may be employed. For example, when a metallic component composed of silver and palladium and a ceramic component constituting the piezoelectric body 11a are contained, a stress caused by a thermal expansion difference between the piezoelectric body 11a and the internal electrode 11b can be reduced and hence the piezoelectric element 11 can be obtained in which unsatisfactory stacking does not occur.

The vibration plate 12 is joined to the second principal surface of the piezoelectric element 11 via a joining member 13.

The vibration plate 12 may be formed of various materials kind such as resin and metal. For example, the vibration plate may be constructed from a resin film of polyethylene, polyimide having a thickness of 10 to 200 μm or like materials. Here, in the vibration plate 12, employable materials are not limited to a resin film and hence a resin plate, a metal plate, a glass plate, or the like may be employed. Alternatively, a part of the housing or the display of a portable terminal described later may serve as the vibration plate 12.

The joining member 13 has a film shape. Further, the joining member 13 is formed of a material softer and more deformable than the vibration plate 12 and hence has a lower Young's modulus than the vibration plate 12.

The joining member 13 may be constructed from a single member or, alternatively, may be a combined member constructed from a plurality of members. For example, preferably employable materials for the joining member 13 include: a double-sided tape in which adhesives are applied on the two faces of a substrate composed of a nonwoven fabric or the like; and various adhesives having elasticity. Further, it is preferable that the thickness of the joining member 13 is greater than the amplitude of flexural vibration of the piezoelectric element 11. Nevertheless, an excessive thickness causes damping in the vibration. Thus, for example, the thickness is set up such that a distance L1 described later may become 100 to 600 μm.

For example, a frame 14 is provided in an outer peripheral part of the vibration plate 12. As shown in FIG. 1(b), the frame 14 is constructed from an upper frame member 141 and a lower frame member 142. Then, the outer peripheral part of the vibration plate 12 is pinched by the upper frame member 141 and the lower frame member 142 so that the vibration plate 12 is supported. That is, the vibration plate 12 is supported by the frame 14 in a state of being stretched within the frame 14. Since the outer peripheral part of the vibration plate 12 is fixed by the frame 14, energy loss is reduced so that the sound pressure can be improved.

The thicknesses, the construction materials, and the like of the upper frame member 141 and the lower frame member 142 constituting the frame 14 are not limited to particular ones. The frame 14 may be formed of various materials such as metal, resin, glass, and ceramic. For example, from the perspective of an excellent mechanical strength and an excellent corrosion resistance, a stainless steel material having a thickness of 100 to 5000 μm or like materials may preferably be employed as the frame 14 (the upper frame member 141 and the lower frame member 142).

Here, in the frame 14 shown in FIG. 1, the inner region has a rectangular shape. Instead, the shape may be a polygon such as a parallelogram, a trapezoid, and a regular n-polygon. The present embodiment is described for an example employing a rectangular shape as shown in FIG. 1.

Further, as shown in FIG. 1(c), the acoustic generator 1 may further include a resin layer 15. In a case where the piezoelectric element 11 is provided on the first principal surface (the upper face in the figure) of the vibration plate 12, the resin layer 15 is disposed so as to cover the piezoelectric element 11 and the first principal surface of the vibration plate 12 in a space defined by the first principal surface of the vibration plate 12 and the inner peripheral surface of the upper frame member 141.

For example, it is preferable that the resin layer 15 is constructed from an acrylic resin whose Young's modulus falls within a range of approximately 1 MPa to 1 GPa. When the piezoelectric element 11 is embedded in the resin layer 15, an appropriate damping effect is induced so that a resonance phenomenon can be suppressed and hence peaks and dips in the frequency characteristics of the sound pressure can be suppressed.

The difference between peaks and dips in the frequency characteristics of the sound pressure is reduced by the above-mentioned resin layer 15. A damping material (not shown) may further be arranged so that mechanical oscillation loss caused by the damping material may be imparted to the vibration plate 12 and thereby the difference between peaks and dips may further be reduced. For example, the damping material is attached to a face of the vibration plate 12 opposite to a face provided with the piezoelectric element 11.

A lead 16 is connected to the surface electrode 11d provided on the first principal surface (the upper face in the figure) of the piezoelectric element 11. Then, when a voltage is applied through the lead 16 onto the piezoelectric element 11, deformation occurs so that, for example, at a particular moment, the piezoelectric layer on the side glued to the vibration plate contracts and the piezoelectric layer on a side of the piezoelectric element 11 opposite to the side glued to the vibration plate 12 expands. Thus, when an AC signal is applied on the piezoelectric element 11, flexural vibration occurs in the piezoelectric element 11 so that flexural vibration is caused in the vibration plate 12.

The lead 16 of the piezoelectric element 11 may be formed of various metallic materials. For example, when the lead 16 is constructed by employing a flexible wiring board in which a metallic foil of copper, aluminum, or the like is inserted between resin films, height reduction of the acoustic generator 1 can be achieved.

Then, the distances between the vibration plate 12 and the piezoelectric body 11a are different. This means that the distances between the piezoelectric body 11a and the vibration plate 12 in the piezoelectric element 11 are different regardless of the presence or absence of the surface electrode 11d (regardless of a difference caused by the thickness of the surface electrode 11d).

Here, as such a configuration that the distances between the vibration plate 12 and the piezoelectric body 11a are different, specifically, the piezoelectric element 11 has a plate shape elongated in one direction when viewed in a plan view and includes a curved region when viewed in a longitudinal sectional view.

For example, when a piezoelectric element 11 which has a shape elongated in one direction when viewed in a plan view and warped (curved) or undulated (e.g., waved) in the one direction is employed, such a configuration is obtained that the piezoelectric element 11 includes a curved region when viewed in a longitudinal sectional view and the distances between the vibration plate 12 and the piezoelectric body 11a are different.

When such a configuration is employed that the piezoelectric element 11 has a flat plate shape without warpage or undulation in the one direction (the longitudinal direction) and the distances between the vibration plate 12 and the piezoelectric body 11a are not different, there is a tendency that the vibration of the piezoelectric element is homogeneously transmitted from the entirety of the second principal surface to the vibration plate and hence the sound quality becomes dull.

In contrast, when such a configuration is employed that the distances between the vibration plate 12 and the piezoelectric body 11a are different, the vibration of the piezoelectric element 11 is more intensely transmitted from the portion (the portion having a distance L1) where the distance between the piezoelectric body 11a and the vibration plate 12 is closest, so that the sound quality becomes clear and sharp. Further, the vibration energy of the piezoelectric element 11 is intensively transmitted from the portion (the portion having the distance L1) where the distance between the piezoelectric body 11a and the vibration plate 12 is closest, and accordingly an effect of increasing sound pressure is also achieved.

Here, it is effective that the difference between the distance L1 at the portion where the distance between the vibration plate 12 and the piezoelectric body 11a is closest and the distance L2 at the portion where the distance is most distant is 30 to 100 μm. Here, the distance L1 at the portion of being closest indicates the distance at the portion where the piezoelectric body 11a and the vibration plate 12 are closest to each other when viewed in a longitudinal sectional view. Further, the distance L2 at the portion of being most distant indicates the distance at the portion where the piezoelectric body 11a and the vibration plate 12 are most distant from each other when viewed in a longitudinal sectional view.

Here, as shown in FIG. 1, it is preferable that the piezoelectric element 11 has a shape which is elongated in one direction when viewed in a plan view (e.g., a rectangular shape when viewed in a plan view) and is curved convex toward the vibration plate 12 side in the one direction (the longitudinal direction). At that time, the second principal surface of the piezoelectric element 11 on a side facing the vibration plate 12 is curved convex. Further, the portion (the portion having the distance L1) where the distance between the vibration plate 12 and the piezoelectric body 11a is closest is located in the center part of the piezoelectric element 11 in the one direction and the portion (the portion having a distance L2) where the distance between the vibration plate 12 and the piezoelectric body 11a is most distant is located in both end parts of the piezoelectric element 11 in the one direction. According to this configuration, the vibration transmitted from both end parts of the piezoelectric element 11 in the one direction becomes weak and the vibration from the portion of being closest (the summit of the convex) becomes intense and spreads around. Thus, dull sound is suppressed and hence the sound quality is further improved. Here, since the curvature is in one direction, the difference between the portion of being closest and the portion of being most distant becomes great and hence the intensity difference in the vibration transmitted by flexural vibration also becomes great.

Figure 3:
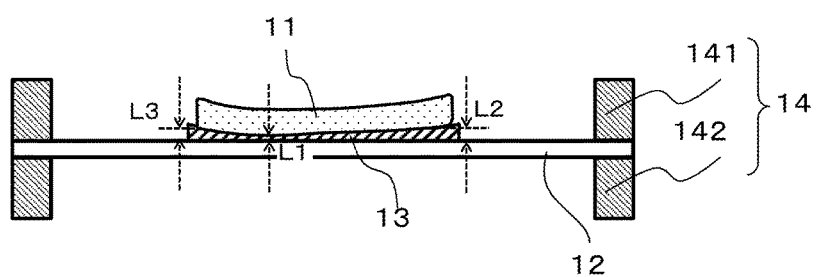
FIG. 3 is a schematic sectional view showing another example of the acoustic generator according to the present embodiment.

Further, as shown in FIG. 3, it is preferable that the piezoelectric element 11 has a shape elongated in one direction when viewed in a plan view (e.g., a rectangular shape when viewed in a plan view) and the portion (the portion indicated by the distance L1) of the piezoelectric body 11a closest to the vibration plate 12 is located at a position deviated from the center of the length of the piezoelectric element 11 in the one direction (the longitudinal direction). At that time, it is preferable that the distance L2 between one end part of the piezoelectric element 11 in the one direction and the vibration plate 12 is different from a distance L3 between the other end part of the piezoelectric element 11 in the one direction and the vibration plate 12. When the position of the summit of the convex is deviated from the center of the one direction, an intensity difference can be imparted to the vibration transmitted from both end parts of the piezoelectric element 11 in the one direction to the vibration plate 12. As a result, the sound quality can be improved.

Figure 4:
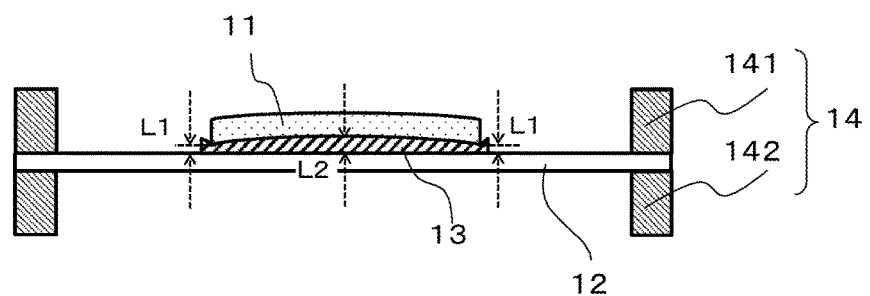
FIG. 4 is a schematic sectional view showing another example of the acoustic generator according to the present embodiment.

Further, as shown in FIG. 4, the piezoelectric element 11 may have a shape elongated in one direction when viewed in a plan view (e.g., a rectangular shape when viewed in a plan view) and may be curved convex toward a side opposite to the vibration plate 12 in the one direction. In other words, the piezoelectric element 11 may have a concaved surface shape concave toward the vibration plate 12 side. At that time, the first principal surface of the piezoelectric element 11 on a side opposite to the side facing the vibration plate 12 is curved convex. Then, the second principal surface of the piezoelectric element 11 on the side facing the vibration plate 12 is curved concave. Further, the portion (the portion having the distance L1) where the distance between the vibration plate 12 and the piezoelectric body 11a is closest is located in both end parts of the piezoelectric element 11 in the one direction (the longitudinal direction) and the portion (the portion having the distance L2) where the distance between the vibration plate 12 and the piezoelectric body 11a is most distant is located in the center part of the piezoelectric element 11 in the one direction. In this case, since the piezoelectric element 11 has a convex surface shape curved convex toward a side opposite to the vibration plate 12 (a concave surface shape curved concave toward the vibration plate 12 side), the vibration is mainly transmitted from both end parts of the piezoelectric element 11 in the one direction so that the vibration energy in one end part becomes approximately half. Thus, the sharp sound quality is alleviated and hence the sound quality can be improved.

Figure 5:
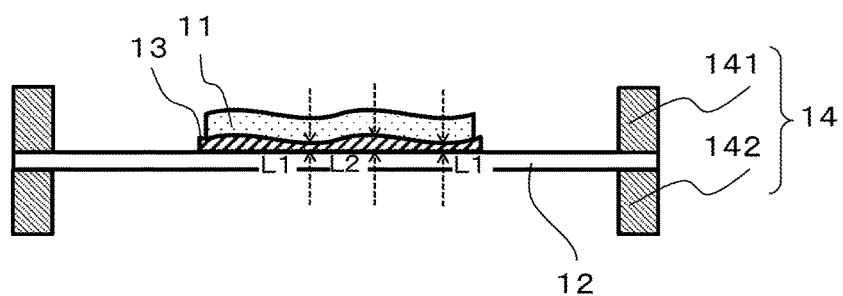
FIG. 5 is a schematic sectional view showing another example of the acoustic generator according to the present embodiment.

Further, as shown in FIG. 5, the piezoelectric element 11 may have a shape elongated in one direction when viewed in a plan view (e.g., a rectangular shape when viewed in a plan view) and may be undulated in the one direction when viewed in a longitudinal sectional view. Then, the portion (the portion having the distance L1) intensely transmitting the vibration energy to the vibration plate 12 is divided into a plurality of portions and hence the vibration spreads from the plurality of portions. Thus, the vibration energy per each portion is reduced so that the sound quality becomes soft in comparison with a case where intense vibration is transmitted from one portion. As a result, the sound quality also can be improved. Also in the case of this shape, it is effective that the portion (the portion indicated by the distance L1) of the piezoelectric body 11a closest to the vibration plate 12 is located at a position deviated from the center of the length of the piezoelectric element 11 in the one direction. Here, for example, employable shapes of undulation in the one direction when viewed in a longitudinal sectional view include a wave shape. In this case, the amplitude and the period is not limited to being fixed and may be random.

The piezoelectric element 11 has been described for an exemplary case of a bimorph-type laminated piezoelectric element. However, employable examples are not limited to this. For example, a unimorph-type laminated piezoelectric element may be glued to the vibration plate 12 (a vibration member 12a) and then flexural vibration may be achieved in its entirety. Further, the description has been given for an exemplary case where one piezoelectric element 11 alone is employed. However, the number of employed piezoelectric elements 11 is not limited to a particular value.

Next, a method for manufacturing an acoustic generator according to the present embodiment is described below.

First, a ceramic green sheet serving as the piezoelectric layer is prepared. Specifically, calcined powder of piezoelectric ceramics, a binder composed of an organic polymer such as an acryl-based substance or a butyral-based substance, and a plasticizer are mixed together so that a ceramic slurry is prepared. Then, a ceramic green sheet is prepared from the ceramic slurry by a tape molding method such as a doctor blade method or a calender roll method. It is sufficient that the employed piezoelectric ceramics has a piezoelectric property. Thus, for example, a perovskite-type oxide composed of lead zirconate titanate ($PbZrO_3$—$PbTiO_3$), or like materials may be employed. Further, as the plasticizer, dibutyl phthalate (DBP), dioctyl phthalate (DOP), or the like may be employed.

Next, a conductive paste serving as the internal electrode 11b is prepared. Specifically, a binder and a plasticizer are added and mixed into metal powder of a silver-palladium alloy so that a conductive paste is prepared. The conductive paste is applied on the above-mentioned ceramic green sheet into a pattern of the internal electrode by screen printing. Then, a plurality of ceramic green sheets onto which the conductive paste has been printed are laminated together and then de-binder processing is performed at a predetermined temperature. After that, the laminate is fired at a temperature of 900 to 1200° C.

Here, in order to provide a shape having a region where the piezoelectric element 11 is curved when viewed in a longitudinal sectional view of the piezoelectric element 11, specifically, a shape which is elongated in one direction when viewed in a plan view and is curved convex or concave toward the vibration plate side in one direction or, alternatively, a shape undulated in one direction when viewed in a longitudinal sectional view, for example, a firing tool (a setter) having a surface shape curved convex or curved concave or a firing tool (a setter) having a wavy surface shape is prepared, then the ceramic green sheet laminate is placed thereon, and then firing is performed in a state where a weight is further placed thereon so that processing into a predetermined shape can be achieved.

Then, grinding processing is performed by using a surface grinder or the like so that the stacked body 11c including the piezoelectric layers and the internal electrodes 11b which are alternately laminated is prepared.

After that, a silver-glass containing conductive paste is prepared by adding a binder, a plasticizer, and a solvent to a mixture of conductive particles composed mainly of silver and glass. Then, the obtained paste is printed in a pattern of the surface electrodes 11d onto the principal surface and the side surface of the stacked body by screen printing or otherwise and then dried. After that, baking processing is performed at a temperature of 650 to 750° C. so that the surface electrodes 11d are formed.

Here, when the surface electrodes 11d and the internal electrodes 11b are electrically connected to each other, the connection may be achieved by forming via holes penetrating through the piezoelectric layers 11a or, alternatively, by forming the external electrodes 11e on the side surface of the stacked body 11c. At that time, an arbitrary manufacturing method may be employed.

Next, by using conductive adhesives, a flexible wiring board or the like serving as the lead is connected and fixed (joined) to the surface electrode 11d formed in the first principal surface of the piezoelectric element 11.

First, a paste for conductive adhesives is applied and formed at a predetermined position of the piezoelectric element 11 by using a technique such as screen printing. After that, in a state where the flexible wiring board abuts against the piezoelectric element, the paste for conductive adhesives is cured so that the flexible wiring board is connected and fixed to the piezoelectric element. Here, the paste for conductive adhesives may have been applied and formed on the flexible wiring board.

When the resin constituting the conductive adhesives is composed of a thermoplastic resin, conductive adhesives are applied and formed at the predetermined position of the piezoelectric element or the flexible wiring board and, after that, heat and pressure is applied in a state where the piezoelectric element 11 and the flexible wiring board abut against each other via the conductive adhesives, so that the thermoplastic resin is softened and fluidize. Then, when the temperature is returned to an ordinary temperature, the thermoplastic resin is hardened again so that the flexible wiring board is connected and fixed to the piezoelectric element. Here, when an anisotropic conductive material is employed as the conductive adhesives, the amount of pressurization needs to be controlled so that nearby conductive particles do not come into contact with each other.

Further, the description given above has been for the technique that conductive adhesives are applied and formed on the piezoelectric element 11 or the flexible wiring board. Instead, a sheet of conductive adhesives having been formed in a sheet shape may be inserted between the piezoelectric element and the flexible wiring board and then heated and pressed so that joining may be achieved.

Next, the vibration plate 12 is joined, via the joining member 13, to the second principal surface of the piezoelectric element 11 located on a side opposite to the principal surface to which the flexible wiring board has been joined.

As a result of the above-mentioned method, the acoustic generator 1 is manufactured.

Figure 6:
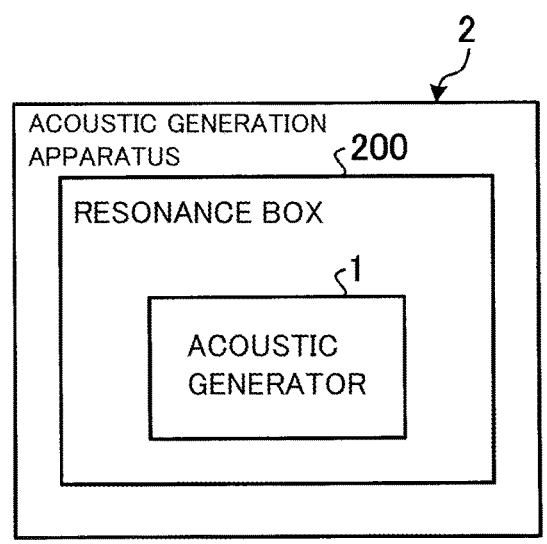
FIG. 6 is a diagram showing the configuration of an acoustic generation apparatus according to the present embodiment.

Next, an example of an acoustic generation apparatus according to the present embodiment is described below. As shown in FIG. 6, the acoustic generator 1 having the configuration described above is contained in a resonance box 200 so that an acoustic generation apparatus 2 is constructed. The resonance box 200 is a housing which contains the acoustic generator 1 and establishes resonance of a sound generated by the acoustic generator 1 and then emits the sound as sound waves from a housing surface. The acoustic generation apparatus 2 may be used independently as a speaker and, further, may preferably be incorporated into a portable terminal, a flat panel television set, a tablet terminal, or the like as described later. Further, the acoustic generation apparatus 2 may be incorporated also into home electronics such as a refrigerator, a microwave oven, a vacuum cleaner, and a washing machine in which the sound quality is not regarded as important in the conventional art.

Figure 7:
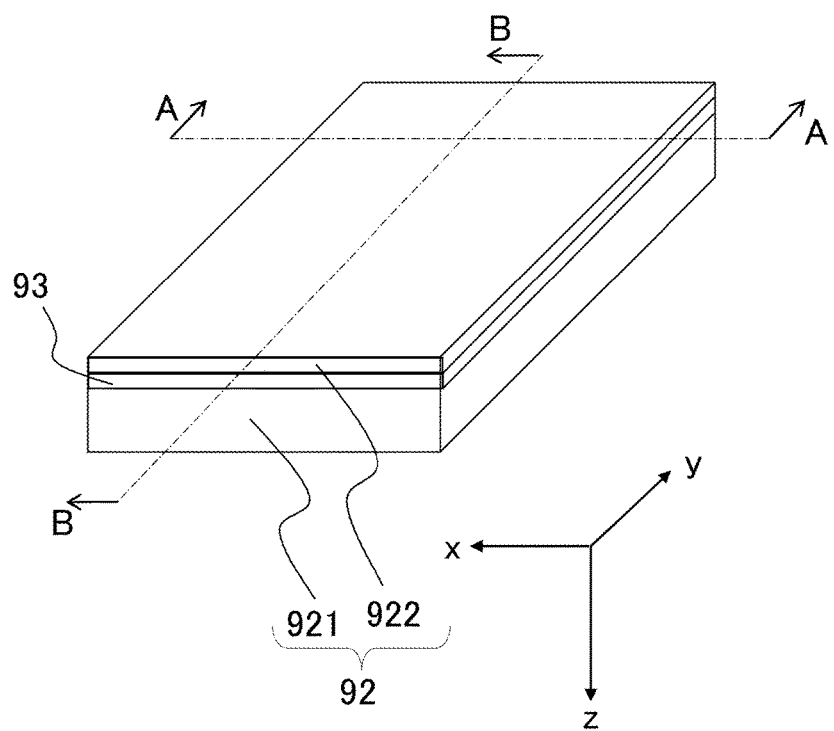
FIG. 7 is a schematic perspective view schematically showing a portable terminal according to the present embodiment.
Figure 8:
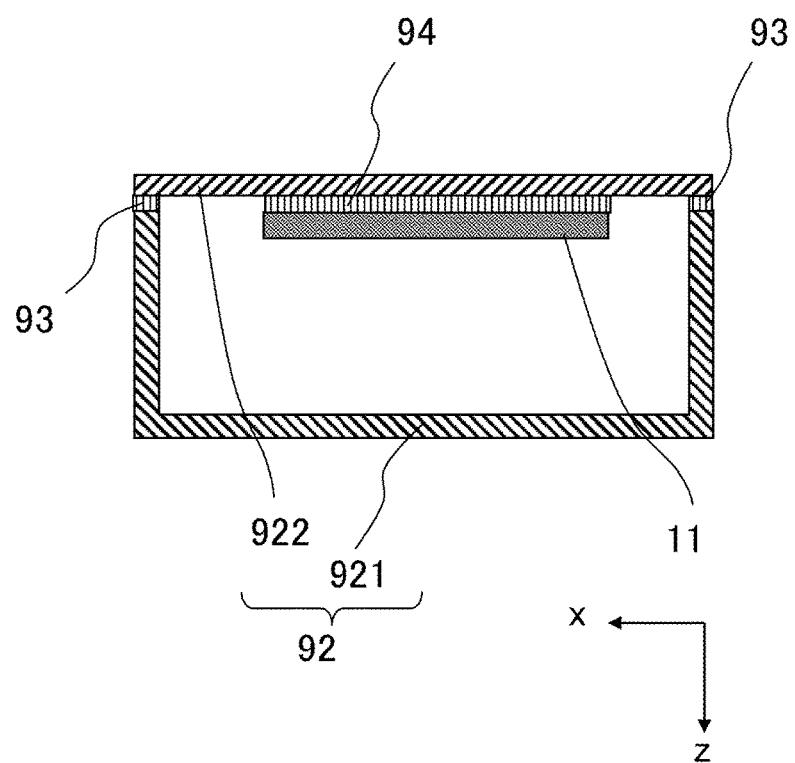
FIG. 8 is a schematic sectional view taken along the line A-A in FIG. 6.
Figure 9:
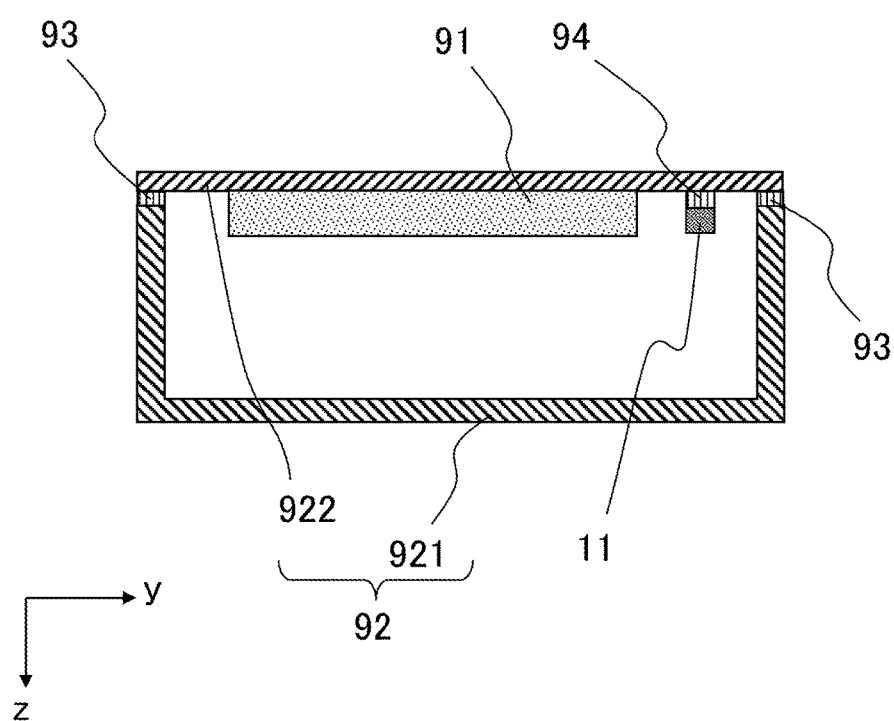
FIG. 9 is a schematic sectional view taken along the line B-B in FIG. 6.

Next, an example of a portable terminal according to the present embodiment is described below. As shown in FIGS. 7 to 9, a portable terminal according to the present embodiment includes an acoustic generator 1 and an electronic circuit (not shown) and further includes a display 91 and a housing 92 serving as a vibration plate. Then, the piezoelectric element 11 is joined to a part of the housing 92. Here, FIG. 7 is a schematic perspective view schematically showing the portable terminal according to the present embodiment. FIG. 8 is a schematic sectional view taken along the line A-A in FIG. 7. FIG. 9 is a schematic sectional view taken along the line B-B in FIG. 7.

In the present example, the piezoelectric element 11 is attached to the housing 92 serving as the cover of the display 91. Here, the piezoelectric element 11 and the housing 92 are joined together by using a deformable joining member. That is, in FIGS. 8 and 9, the joining member 94 is such a deformable joining member.

In a case where the piezoelectric element 11 and the housing 92 are joined together by using the deformable joining member 94, the deformable joining member 94 more largely deforms than the housing 92 when vibration is transmitted from the piezoelectric element 11.

At that time, vibration of reverse phase reflected from the housing 92 can be alleviated by the deformable joining member 94. This allows the piezoelectric element 11 to transmit intense vibration to the housing 92 without being affected by vibration in the surroundings.

In particular, it is preferable that at least a part of the joining member 94 is constructed from a viscoelastic material, because the intense vibration from the piezoelectric element 11 can be transmitted to the housing 92 and, at the same time, weak vibration reflected from the housing 92 can be absorbed by the joining member 94. For example, a double-sided tape in which adhesives are applied on the two faces of a substrate composed of a nonwoven fabric or the like or, alternatively, a joining member containing adhesives having elasticity may be employed. For example, the thickness of such a material may be 10 μm to 2000 μm.

Then, in the present example, the piezoelectric element 11 is attached to a part of the housing 92 serving as the cover of the display 91 so that this part of the housing 92 serves as a vibration plate 922. Here, in the present example, the piezoelectric element 11 has been joined to the housing 92. Instead, the piezoelectric element 11 may be joined to the display 91 and then the display 91 may serve as a vibration plate.

The housing 92 includes: a housing body 921 having a box shape whose one face is opened; and a vibration plate 922 which covers the opening of the housing body 921. The housing 92 (the housing body 921 and the vibration plate 922) may preferably be formed of a material such as a synthetic resin having a high rigidity and a high elastic modulus. Here, for example, the thickness of the vibration plate 922 is set to be 0.4 mm to 1.5 mm.

The peripheral edge part of the vibration plate 922 is attached to the housing body 921 via a joining material 93 in a manner of permitting vibration. The joining material 93 is formed from a material softer and more deformable than the vibration plate 922 and hence has a lower Young's modulus than the vibration plate 922.

The joining member 93 may be constructed from a single member or, alternatively, may be a combined member constructed from a plurality of members. As the joining material 93, for example, a double-sided tape in which adhesives are applied on the two faces of a substrate composed of a nonwoven fabric or the like may preferably be employed. The thickness of the joining material 93 is set up so that a situation may be avoided that the thickness becomes excessive and thereby the vibration is damped. For example, the thickness is set to be 0.1 mm to 0.6 mm. However, in the portable terminal of the invention, the employed construction material of the joining material 93 is not limited to a particular one. Thus, the joining material 93 may be formed of a material harder and hence harder to deform than the vibration plate 922. Further, when appropriate, a configuration devoid of the joining material 93 may be employed.

For example, employable electronic circuits (not shown) include: a circuit for processing image information to be displayed on the display 91 or audio information transmitted through the portable terminal; and a communication circuit. At least one of these circuits may be incorporated or, alternatively, all circuits may be incorporated. Further, a circuit having another function may be incorporated. Further, a plurality of electronic circuitries may be incorporated. Here, the electronic circuit and the piezoelectric element 11 are connected to each other through wirings for connection (not shown).

The display 91 is a display device having a function of displaying image information and, for example, may preferably be constructed from a known display such as a liquid crystal display and an organic EL display. Further, the display 91 may include an input device such as a touch panel. Further, the cover (the vibration plate 922) of the display 91 may include an input device such as a touch panel. Further, the entirety of the display 91 or a part of the display 91 may serve as a vibration plate.

Here, the portable terminal includes communication means (a communication section) for performing transmission and reception of data or the like through an antenna or the like. Examples of the portable terminal include: a portable phone represented by a smartphone; a mobile device such as a tablet PC and a notebook PC; and a game machine.

The portable terminal of the present example is constructed from the acoustic generator 1 having an improved sound quality, and hence a portable terminal having a high sound quality is obtained.

Further, the portable terminal according to the present embodiment is characterized in that the display 91 or the housing 92 generates vibration which transmits sound information through ear cartilage or by air conduction. In the portable terminal of the present example, the vibration plate (the display 91 or the housing 92) is brought into contact with an ear directly or via another material, so that the vibration is transmitted to the ear cartilage and thereby the sound information can be transmitted. That is, when the vibration plate (the display 91 or the housing 92) is brought into contact with the ear directly or indirectly, the vibration is transmitted to the ear cartilage and thereby the sound information can be transmitted. By virtue of this, for example, a portable terminal can be obtained in which even when the surroundings are noisy, sound information can clearly be transmitted and hence the sound can clearly be heard even in a noisy circumstance or, alternatively, even a hard-of-hearing person can recognize the sound. Here, for example, the material to be inserted between the vibration plate (the display 91 or the housing 92) and the ear may be the cover of the portable terminal, a headphone, or an earphone. That is, an arbitrary material may be employed as long as the material can transmit vibration. Further, a portable terminal may be employed in which sound generated from the vibration plate (the display 91 or the housing 92) propagates in the air so that sound information is transmitted. Alternatively, a portable terminal may be employed in which sound information is transmitted through a plurality of routes.

Figure 10:
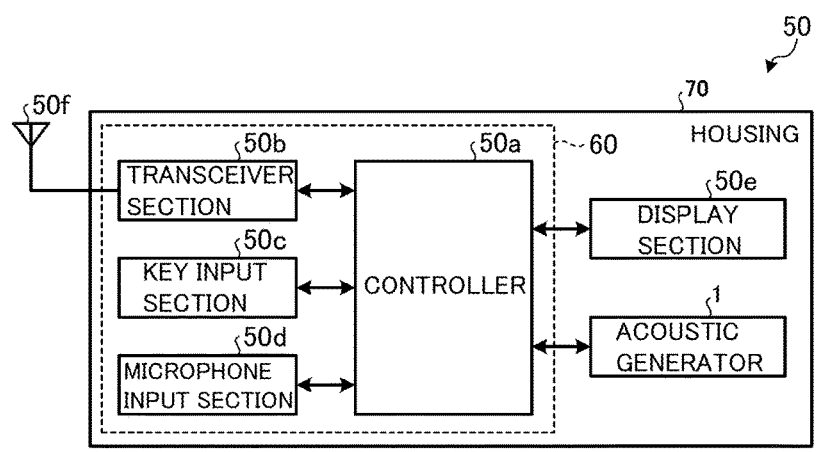
FIG. 10 is a diagram showing the configuration of an electronic apparatus according to the present embodiment.

Next, an electronic apparatus employing the acoustic generator is described below with reference to FIG. 10. FIG. 10 is a diagram showing the configuration of an electronic apparatus 50 according to the present embodiment. Here, in the figure, components necessary for description are solely shown and description of general components is omitted.

As shown in FIG. 10, the electronic apparatus 50 of the present example includes: an acoustic generator 1; an electronic circuit 60 connected to the acoustic generator 1; and a housing which contains the electronic circuit 60 and the acoustic generator 1. The electronic apparatus 50 has a function of generating a sound through the acoustic generator 1.

The electronic apparatus 50 includes the electronic circuit 60. For example, the electronic circuit 60 is constructed from a controller 50*a*, a transceiver section 50*b*, a key input section 50*c*, and a microphone input section 50*d*. The electronic circuit 60 is connected to the acoustic generator 1 and has a function of outputting an audio signal to the acoustic generator 1. The acoustic generator 1 generates a sound on the basis of the audio signal inputted from the electronic circuit 60.

Further, the electronic apparatus 50 includes a display section 50*e*, an antenna 50*f*, and the acoustic generator 1. Further, the electronic apparatus 50 includes a housing 70 which contains these devices. Here, FIG. 10 shows a situation that all individual devices such as the controller 50*a* are contained in the single housing 70. However, the form of containing these devices is not limited to this. In the present embodiment, it is sufficient that at least the electronic circuit 60 and the acoustic generator 1 are contained in the single housing 70.

The controller 50*a* is a control section of the electronic apparatus 50. Under the control of the controller 50*a*, the transceiver section 50*b* performs transmission and reception of data or the like through the antenna 50*f*. The key input section 50*c* is an input device of the electronic apparatus 50 and receives key input operation from the operator. Similarly, the microphone input section 50*d* is an input device of the electronic apparatus 50 and receives voice input operation or the like from the operator. The display section 50*e* is a display output device of the electronic apparatus 50 and outputs display information under the control of the controller 50*a*.

Further, the acoustic generator 1 operates as an acoustic output device in the electronic apparatus 50. The acoustic generator 1 is connected to the controller 50*a* of the electronic circuit 60 and then generates a sound in response to application of a voltage controlled by the controller 50*a*.

Here, FIG. 10 has been described for a case that the electronic apparatus 50 is a portable terminal apparatus. However, the type of the electronic apparatus 50 is not limited to a particular one. That is, the invention may be applied to various consumer devices having a function of generating a sound. For example, in addition to a flat panel television set and a car audio apparatus, the invention may be applied to products having a function of generating a sound, for example, various products such as a vacuum cleaner, a washing machine, a refrigerator, and a microwave oven.

The electronic apparatus 50 of the present example is constructed from the acoustic generator 1 having an improved sound quality and hence an electronic apparatus having a high sound quality can be obtained.

REFERENCE SIGNS LIST

1: Acoustic generator
11: Piezoelectric element
11*a*: Piezoelectric body
11*b*: Internal electrode
11*c*: Stacked body
11*d*: Surface electrode
11*e*: External electrode
12: Vibration plate
13: Joining member
14: Frame
141: Upper frame member
142: Lower frame member
15: Resin layer
16: Lead
2: Acoustic generation apparatus
200: Resonance box
91: Display
92: Housing
921: Housing body
922: Vibration plate
93: Joining material
94: Joining member
50: Electronic apparatus
50*a*: Controller
50*b*: Transceiver section
50*c*: Key input section
50*d*: Microphone input section
50*e*: Display section
50*f*: Antenna
60: Electronic circuit

The invention claimed is:

1. An acoustic generator, comprising:
a piezoelectric element having a piezoelectric body; and
a vibration plate joined to the piezoelectric element via a joining material, wherein the vibration plate is flat and distances between the vibration plate and the piezoelectric body are different,
wherein the piezoelectric element has a shape which is elongated in one direction when viewed in a plan view of the piezoelectric element and is curved convex toward the vibration plate side in the one direction in a state before an AC signal is applied.

2. The acoustic generator according to claim 1, wherein the piezoelectric element includes a curved region when viewed in a longitudinal sectional view of the piezoelectric element.

3. The acoustic generator according to claim 1, wherein a portion of the piezoelectric body closest to the vibration plate is located at a position deviated from a center of a length of the piezoelectric element in the one direction.

4. The acoustic generator according to claim 1, comprising a frame disposed in an outer peripheral part of the vibration plate.

5. An acoustic generator, comprising:
a piezoelectric element having a piezoelectric body; and
a vibration plate joined to the piezoelectric element via a joining material, wherein the vibration plate is flat and distances between the vibration plate and the piezoelectric body are different,
wherein the piezoelectric element has a shape which is elongated in one direction when viewed in a plan view of the piezoelectric element and is undulated in the one direction in a state before an AC signal is applied when viewed in a longitudinal sectional view of the piezoelectric element.

6. The acoustic generator according to claim 5, comprising a frame disposed in an outer peripheral part of the vibration plate.

7. An acoustic generator, comprising:
a piezoelectric element having a piezoelectric body; and
a vibration plate joined to the piezoelectric element via a joining material, wherein the vibration plate is flat and distances between the vibration plate and the piezoelectric body are different,
wherein the piezoelectric element has a shape which is elongated in one direction when in a plan view of the piezoelectric element and is curved convex toward a side opposite to the vibration plate in the one direction in a state before an AC signal is applied.

8. The acoustic generator according to claim 7, comprising a frame disposed in an outer peripheral part of the vibration plate.

9. An acoustic generation apparatus, comprising:
the acoustic generator according to claim 1; and
a housing which contains the acoustic generator.

10. A portable terminal, comprising:
the acoustic generator according to claim 1;
an electronic circuit;
a display; and
a housing,
the vibration plate of the acoustic generator being the display or the housing.

11. An electronic apparatus, comprising:
the acoustic generator according to claim 1;
an electronic circuit connected to the acoustic generator; and
a housing which contains the electronic circuit and the acoustic generator,
the electronic apparatus having a function of generating a sound through the acoustic generator.

12. An acoustic generation apparatus, comprising:
the acoustic generator according to claim 5; and
a housing which contains the acoustic generator.

13. A portable terminal, comprising:
the acoustic generator according to claim 5;
an electronic circuit;
a display; and
a housing,
the vibration plate of the acoustic generator being the display or the housing.

14. An electronic apparatus, comprising:
the acoustic generator according to claim 5;
an electronic circuit connected to the acoustic generator; and
a housing which contains the electronic circuit and the acoustic generator,
the electronic apparatus having a function of generating a sound through the acoustic generator.

15. An acoustic generation apparatus, comprising:
the acoustic generator according to claim 7; and
a housing which contains the acoustic generator.

16. A portable terminal, comprising:
the acoustic generator according to claim 7;
an electronic circuit;
a display; and
a housing,
the vibration plate of the acoustic generator being the display or the housing.

17. An electronic apparatus, comprising:
the acoustic generator according to claim 7;
an electronic circuit connected to the acoustic generator; and
a housing which contains the electronic circuit and the acoustic generator,
the electronic apparatus having a function of generating a sound through the acoustic generator.

* * * * *